US012754965B2

(12) United States Patent
Takashima

(10) Patent No.: US 12,754,965 B2
(45) Date of Patent: Oct. 6, 2026

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Keiichi Takashima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/533,502

(22) Filed: Dec. 8, 2023

(65) Prior Publication Data

US 2024/0193217 A1 Jun. 13, 2024

(30) Foreign Application Priority Data

Dec. 13, 2022 (JP) ................................ 2022-198712

(51) Int. Cl.
*G06F 16/9538* (2019.01)
*G06F 16/954* (2019.01)
*G06V 30/416* (2022.01)

(52) U.S. Cl.
CPC ........ *G06F 16/9538* (2019.01); *G06F 16/954* (2019.01); *G06V 30/416* (2022.01); *G06V 2201/09* (2022.01)

(58) Field of Classification Search
CPC .............. G06F 16/9538; G06F 16/954; G06V 30/416; G06V 2201/09
See application file for complete search history.

(56) References Cited

U.S. PATENT DOCUMENTS

2011/0131241 A1* 6/2011 Petrou ..................... G06F 16/95 707/E17.014
2015/0169634 A1* 6/2015 Li ........................... G06F 18/28 707/723
2016/0026628 A1* 1/2016 Sears ...................... G06F 18/22 382/199
2018/0336001 A1* 11/2018 Abuelsaad .............. G10L 17/22
2019/0102362 A1* 4/2019 Orciuoli ................ G06F 40/103

FOREIGN PATENT DOCUMENTS

JP 2008282094 A 11/2008

* cited by examiner

*Primary Examiner* — Tony Wu
(74) *Attorney, Agent, or Firm* — ROSSI, KIMMS & McDOWELL LLP

(57) ABSTRACT

An information processing apparatus that is connectable to the Internet, includes: an obtaining unit configured to obtain a logo image corresponding to a logo representing a particular organization from a scanned image of a document; a search unit configured to search for a web page including an image similar to the obtained logo image through the Internet; and an inference unit configured to infer an organization name corresponding to the image included in the web page by performing named entity recognition using a named entity inference model for the web page searched by the search unit.

8 Claims, 17 Drawing Sheets

| No. | COORDINATES | SIZES | TYPE |
|---|---|---|---|
| 1 | (850, 100) | (500, 200) | IMAGE |
| 2 | (850, 200) | (500, 200) | TEXT |
| 3 | ... | ... | ... |
| 4 | ... | ... | ... |
| 5 | ... | ... | ... |

FIG.7

| WORD STRING |
| --- |
| {{ORG, AAA Inc.}, {ADR,DENEN, CHUO CITY, TOKYO}, {TEL, 03-1234-5678}}<br>{{ORG, BBB Ltd.}, {TEL, 075-5678-1234}} |
| INVOICE |
| To : ABC Inc. |
| Total Price : $4,500.00 |
| ... |

FIG.13

INFORMATION PROCESSING APPARATUS, METHOD OF CONTROLLING INFORMATION PROCESSING APPARATUS, AND STORAGE MEDIUM

BACKGROUND OF THE DISCLOSURE

Field of the Disclosure

The present disclosure relates to a technology of extracting an organization name from a document including an image.

Description of the Related Art

There are technologies of reading characters by optical character recognition (OCR) from a document image obtained by scanning a form such as an estimate sheet, a bill, or a delivery slip with a scanner or the like, converting the characters into an electronic file, and automatically applying an appropriate file name. Elements constituting the automatically applied file name include a company name, a person name, a document number, a document issue date, and the like in a document in addition to the date and time of file production and the like. These elements can be extracted by using a named entity recognition technology that is an applied technology in the field of natural language processing.

In a case where an image (logo image) representing a company logo or the like is included in a form, inaccurate characters are often extracted from the logo image by OCR. In a case of a form on which a logo image is illustrated but no company name is illustrated, a named entity of the company name cannot be correctly extracted. Even in a case where a company name is illustrated as well as a logo image, a wrong company name is potentially obtained through named entity recognition in a case where a character string in the logo image is recognized as a wrong character string by OCR. Even in a case where characters are correctly extracted by OCR, a brand name or a service name is sometimes extracted instead of a company name.

Japanese Patent Laid-Open No. 2008-282094 discloses a technology of improving the accuracy of character recognition of a logo image by using a logo information table in which characteristic amount data of a logo image and a company name or the like are registered.

However, a large amount of labor is needed to register a large number of logo images of companies and the like to the logo information table. Furthermore, it is impractical to timely register logo images of companies and the like whose number increases on a daily basis.

SUMMARY OF THE DISCLOSURE

An information processing apparatus that is connectable to the Internet, according to the present disclosure includes: an obtaining unit configured to obtain a logo image corresponding to a logo representing a particular organization from a scanned image of a document; a search unit configured to search for a web page including an image similar to the obtained logo image through the Internet; and an inference unit configured to infer an organization name corresponding to the image included in the web page by performing named entity recognition using a named entity inference model for the web page searched by the search unit.

Further features of the present disclosure will become apparent from the following description of exemplary embodiments with reference to the attached drawings.

BRIEF DESCRIPTION OF THE DRAWINGS

FIG. 7 is a diagram illustrating an example of block information;

FIG. 13 is a diagram illustrating an example of an extracted second input word string;

DESCRIPTION OF THE EMBODIMENTS

Figure 1:
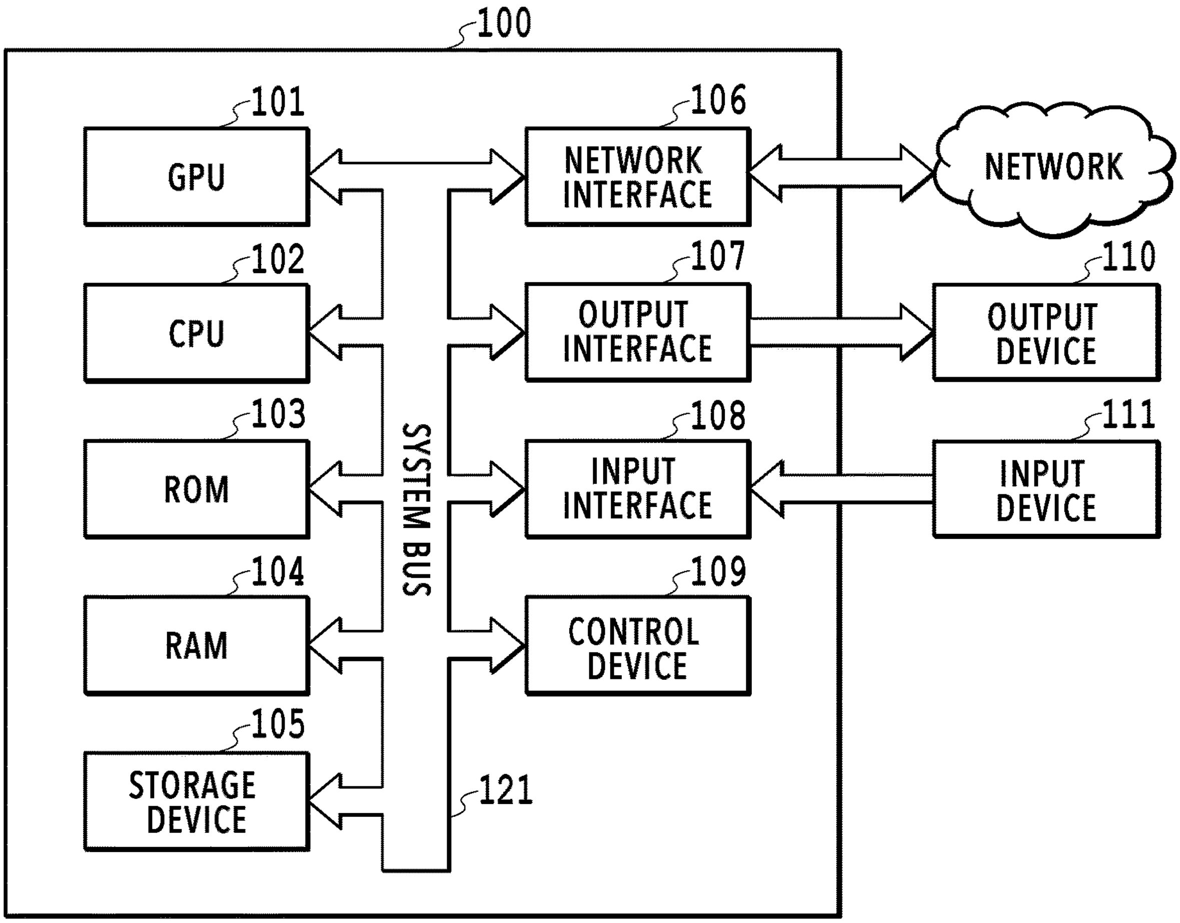
FIG. 1 is a block diagram illustrating a hardware configuration of an information processing apparatus.

Hereinafter, with reference to the attached drawings, the present disclosure is explained in detail in accordance with preferred embodiments. Configurations shown in the following embodiments are merely exemplary and the present disclosure is not limited to the configurations shown schematically. In addition, the same components are denoted by the same reference numerals. Further, each process (step) in the flowcharts is denoted by a reference numeral starting with S.

First Embodiment

A first embodiment of the present disclosure will be described below with reference to the accompanying drawings.

FIG. 1 is a block diagram illustrating a hardware configuration of an information processing apparatus 100 according to the first embodiment.

The information processing apparatus 100 includes a GPU 101, a CPU 102, a ROM 103, a RAM 104, a storage device 105, a network interface 106, an output interface 107, an input interface 108, and a control device 109. The above-described devices are connected to one another through a system bus 121.

The GPU 101 is a processor configured to execute efficient calculation by processing data in parallel and executes high-speed arithmetic processing in place of the CPU 102.

The CPU 102 controls the information processing apparatus 100 by reading a control program and data stored in the ROM 103 onto the RAM 104 and executing various kinds of processing to be described later.

The ROM 103 stores fixed data such as the control program and data executed by the CPU 102.

The RAM 104 is used as a temporary storage region such as a main memory or a work area of the CPU 102.

The storage device 105 is a large-capacity storage device configured to store document data or the like.

The network interface 106 is an interface configured to perform connection to a network, and thus the information processing apparatus 100 is connectable to a network such as the Internet.

The output interface 107 is an interface configured to output data or the like to an external output device 110.

The input interface 108 is an interface configured to receive data, commands, or the like from an external input device 111.

The control device 109 is a device configured to perform various kinds of control.

The information processing apparatus 100 is described as one apparatus above, but may be constituted by a plurality of apparatuses. For example, the storage device 105 may be an external storage server.

Figure 2:
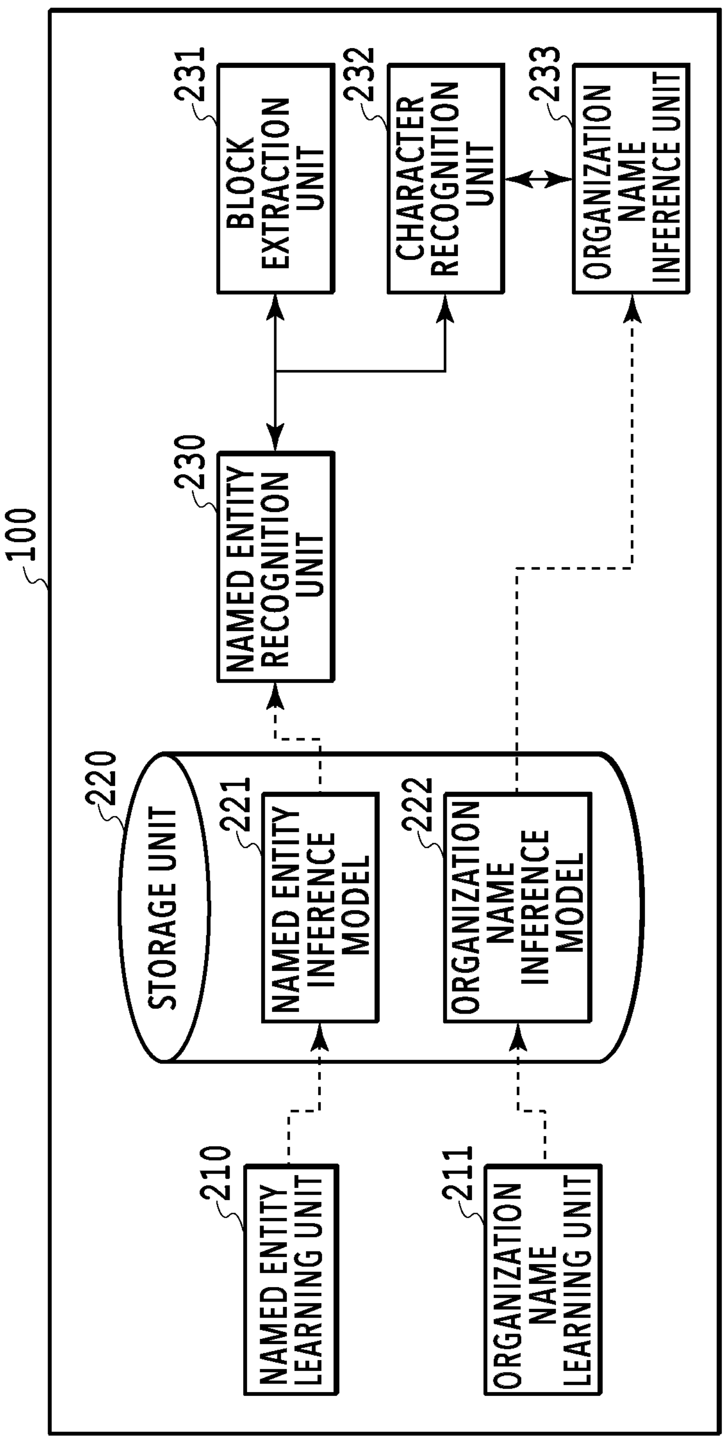
FIG. 2 is a block diagram illustrating a functional configuration of the information processing apparatus.

FIG. 2 is a block diagram illustrating a functional configuration of the information processing apparatus 100 according to the first embodiment.

A named entity learning unit 210 establishes a named entity inference model 221 by learning a learning character string set in which a named entity label is applied for each character string, and stores data of the named entity inference model 221 in a storage unit 220.

An organization name learning unit 211 establishes an organization name inference model 222 by learning a learning character string set in which an organization name label is applied for each character string, and stores data of the organization name inference model 222 in the storage unit 220.

The storage unit 220 is implemented by the storage device 105, stores the data of the named entity inference model 221 and the data of the organization name inference model 222, and provides the data to each functional unit.

A named entity extraction unit 230 includes a block extraction unit 231, a character recognition unit 232, and an organization name inference unit 233 and extracts named entities from document data by using the named entity inference model 221.

The block extraction unit 231 extracts regions of text, image, table, and the like from document data.

The character recognition unit 232 extracts characters by OCR from each region extracted by the block extraction unit 231.

The organization name inference unit 233 performs image search at a search site or the like in a case where an image extracted by the block extraction unit 231 is a logo image, and infers an organization name based on data of a found web page by using the organization name inference model 222.

Each functional unit in FIG. 2 is implemented as the CPU 102 executes the control program read from the ROM 103 onto the RAM 104 and a computer program such as an application loaded from the storage device 105 onto the RAM 104. An execution result of each processing is held in the RAM 104, whereas data of the named entity inference model 221 and data of the organization name inference model 222 are stored in the storage device 105.

<Named Entity Learning Processing>

First, operation that the named entity learning unit 210 establishes the named entity inference model 221 in the information processing apparatus 100 according to the present embodiment will be described below.

Figure 3:
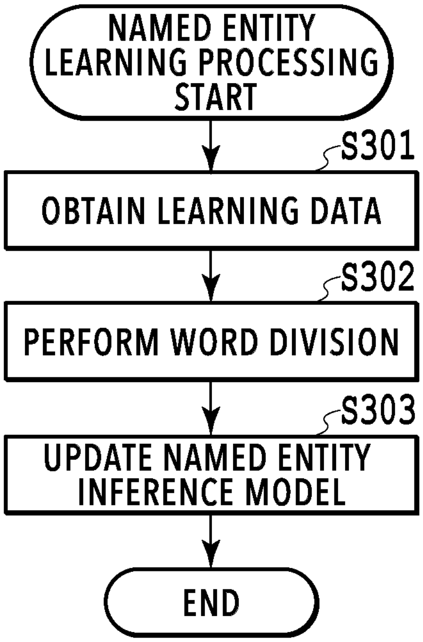
FIG. 3 is a flowchart illustrating named entity inference model establishment processing by a named entity learning unit.

FIG. 3 is a flowchart of processing that the named entity learning unit 210 establishes the named entity inference model 221.

At S301, the named entity learning unit 210 obtains a first learning character string in which a named entity label is applied for each character string. All obtained first learning character strings are stored in the storage device 105.

A named entity label is applied in an IOB2 format, which is typically used in the field of the named entity recognition technologies. In the IOB2 format, a B-<optional character string> label is applied to the leading unit of a character string that means a named entity, an I-<optional character string> label is applied to the second unit or later, or an O label is applied in a case where no named entity is applicable. Then, a region of I labels of the same kind, which follows the B label is set as a character string of the label. For example, in a case where an organization name "ORG" label is applied to "ABC Inc." in a character string "To: ABC Inc.", a B-ORG label is applied to the fourth character "A", an I-ORG label is applied to each of the fifth character "B" to the eleventh character ".", and an O label is applied to each of the first to third characters "To:". In this manner, "ABC Inc." is expressed as a named entity ORG. The format of label application is not limited to the IOB2 format but may be an IOB1 format, an IOE1 format, or the like. After the CPU 102 obtains all first learning character strings to each of which a named entity label is applied, the processing proceeds to S302.

At S302, a first learning word string is generated by dividing each obtained first learning character string into words (with a space between words). The named entity learning unit 210 generates all first learning word strings by applying the processing, which receives inputting of the first learning character string and generates the first learning word string, to each first learning character string. For example, a first learning character string "To: ABC Inc." is divided into five words of "/To/:/ABC/Inc/./". A named entity label is applied to "ABC/Inc/.". This named entity label is the same as that of the first learning character string before the division. After the CPU 102 generates all first learning word strings, the processing proceeds to S303.

At S303, the named entity inference model 221 is established based on all first learning word strings, and the data of the named entity inference model 221 is stored in the storage unit 220. The named entity inference model 221 is not limited but may be any machine learning model in which the named entity label of each learning word can be inferred based on a word string applied to the word in the first learning word string. Methods such as LSTM and BERT are applicable. After the CPU 102 updates the named entity inference model 221, the processing process of the flowchart illustrated in FIG. 3 ends.

<Organization Name Learning Processing>

Operation that the organization name learning unit 211 establishes the organization name inference model 222 in the information processing apparatus 100 according to the present embodiment will be described below.

Figure 4:
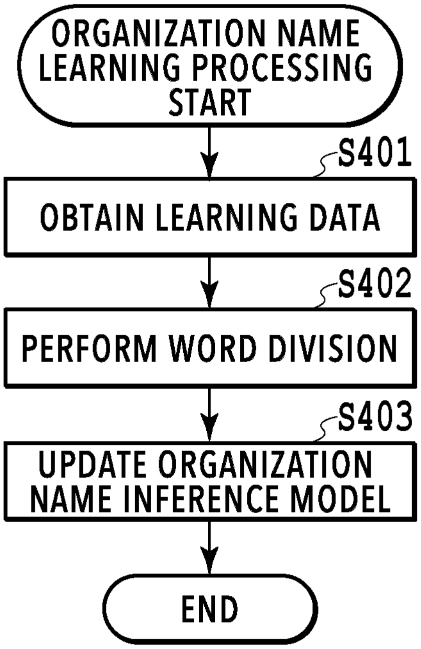
FIG. 4 is a flowchart illustrating organization name inference model establishment processing by an organization name learning unit.

FIG. 4 is a flowchart illustrating the processing that the organization name learning unit 211 establishes the organization name inference model 222.

Basic processing is the same as that of the above-described named entity learning processing, but the learning data is different. Specifically, the learning data of the organization name learning processing is the data in which an "ORG" label is applied to a character string of an organization name for a page introducing a particular organization, such as an organization overview on a web page of the organization.

At S401, a second learning character string in which the "ORG" label is applied to the organization name is obtained. After the CPU 102 performs the processing described at S401, the processing proceeds to S402.

At S402, a second learning word string is generated by dividing the second learning character string into words. This processing is performed for all second learning character strings. After the CPU 102 generates all second learning word strings, the processing proceeds to S403.

At S403, the organization name inference model 222 is established based on all second learning word strings, and data of the organization name inference model 222 is stored in the storage unit 220. After the organization name inference model 222 is updated, the processing process of the flowchart illustrated in FIG. 4 ends.

<Named Entity Recognition Processing>

The operation that the named entity recognition unit 230 extracts the named entities from the document image data in the information processing apparatus 100 according to the present embodiment will be described below.

Figure 5:
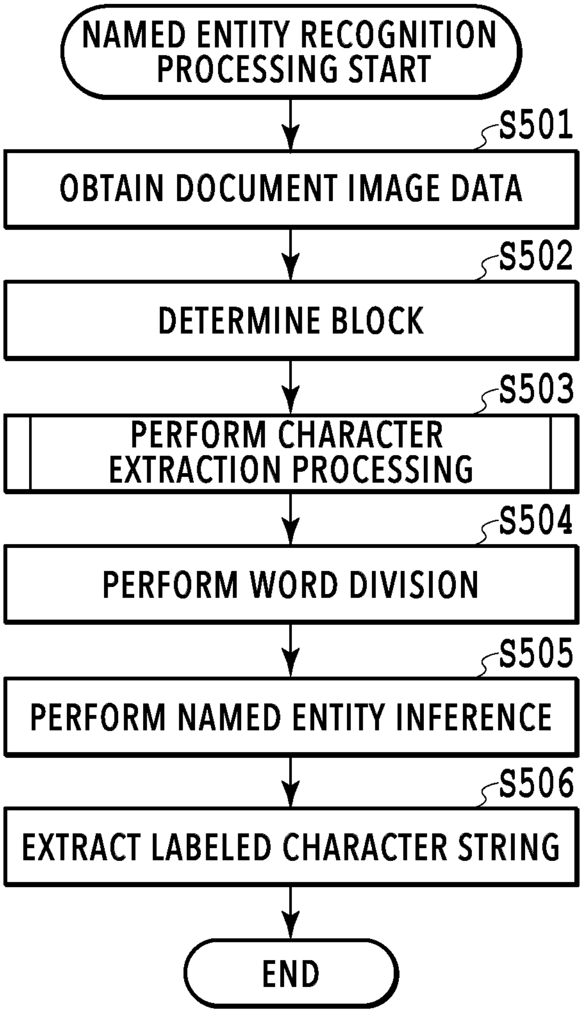
FIG. 5 is a flowchart illustrating named entity recognition processing by a named entity recognition unit.

FIG. 5 is a flowchart of the processing that the named entity recognition unit 230 extracts the named entities from the document image data.

At S501, the document image data (the scanned image data) is obtained by optically reading a paper document by using a scanner or the like. After the document image data is obtained, the processing proceeds to S502.

At S502, the block extraction unit 231 extracts a region (block) of each content type from the obtain document image data. The block information is generated by using the results of the extraction and stored in the RAM 104.

Figure 6:
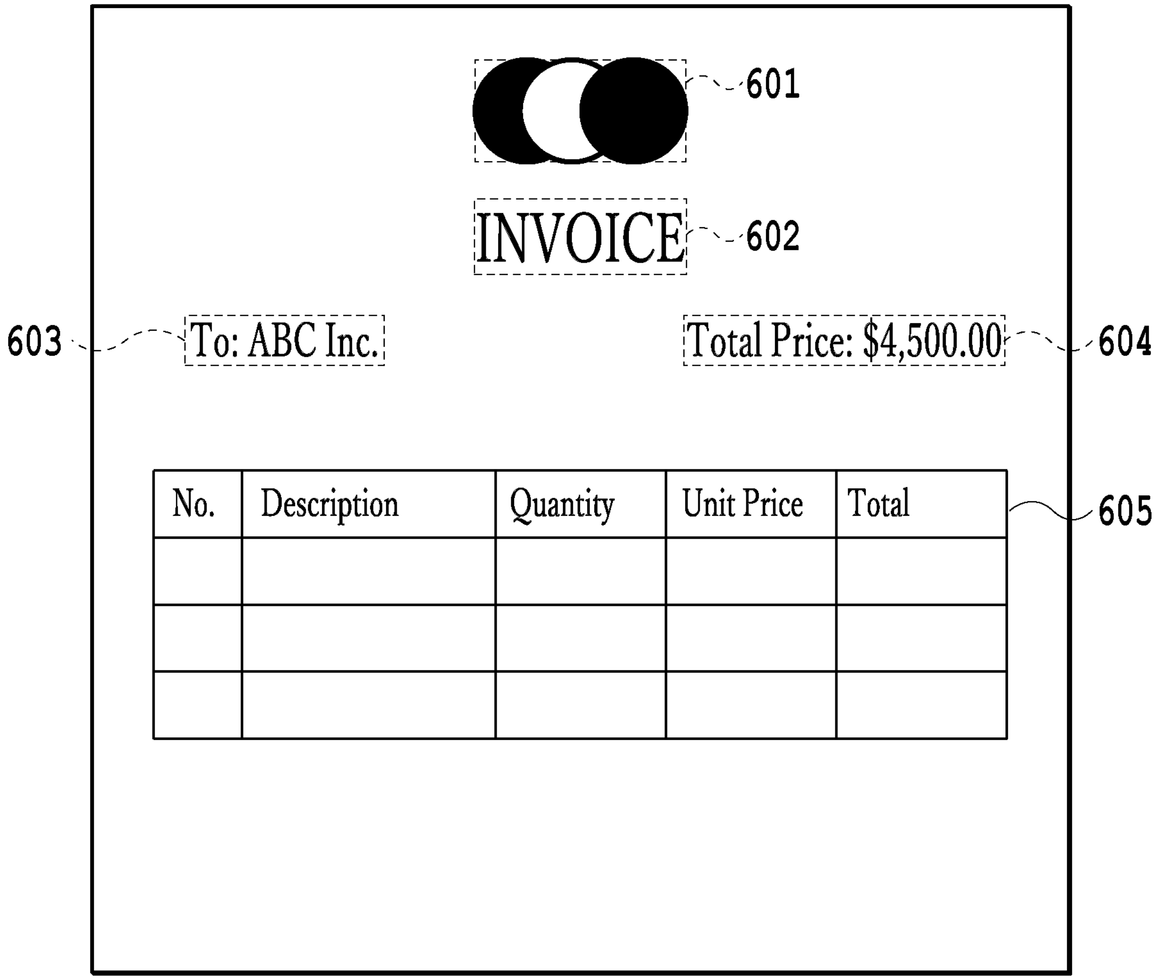
FIG. 6 is a diagram illustrating an example of document image data.

FIG. 6 illustrates exemplary document image data according to the present embodiment. Dotted frames in the diagram are illustrated for sake of description but do not exist in the actual document image data. At S502, the blocks 601, 602, 603, 604, and 605 are extracted from the document image data. The block 601 is a logo such as a company logo in which the organization has.

FIG. 7 illustrates exemplary block information that outputs the results obtained by executing the block extraction. Block information 1 corresponds to a logo image of the block 601. The block information includes coordinates, sizes, and a type. The coordinates are coordinates of an upper-left point of the block. The origin of the coordinates is at the upper-left corner of the document image, an X coordinate denotes the lateral direction (the horizontal direction), and a Y coordinate denotes the longitudinal direction (the vertical direction). The sizes are the width and height of the block. The type is the type of a content in the block, and the type of text, image, or table can be extracted in the present embodiment. After the block information is stored in the RAM 104, the processing proceeds to S503.

At S503, the character recognition unit 232 performs the character extraction based on the document image data and the block information. The character extraction processing will be described later in detail. After the character recognition unit 232 executes the character extraction processing, the processing proceeds to S504.

At S504, an input word string is generated by dividing an extracted character string into words (with a space between words). For example, an input word string "/To/:/ABC/Inc/./" is generated from a character string "To: ABC Inc.". After all input word strings are generated, the processing proceeds to S505.

At S505, the named entity inference model 221 infers the named entity label for each word in each input word string. In a case of the above-described input word string "/To/:/ABC/Inc/./", "/O/O/B-ORG/I-ORG/I-ORG/" is obtained as the inference result. After the inference of the named entity label for each word in an input word string is performed for all input word strings, the processing proceeds to S506.

At S506, a named entity in each input word string is extracted based on the inferred named entity label of each word. Specifically, a character string that starts with a B label and connects the following I labels of the same kind is extracted as the named entity based on the definition of the IOB2 format. In the above-described example, a character string "ABC Inc." connecting the B-ORG "ABC", the following I-ORG "Inc", and "." is extracted as the named entity "ORG". After the named entity in each input word string is extracted, the processing process of the flowchart illustrated in FIG. 5 ends.

Figure 8:
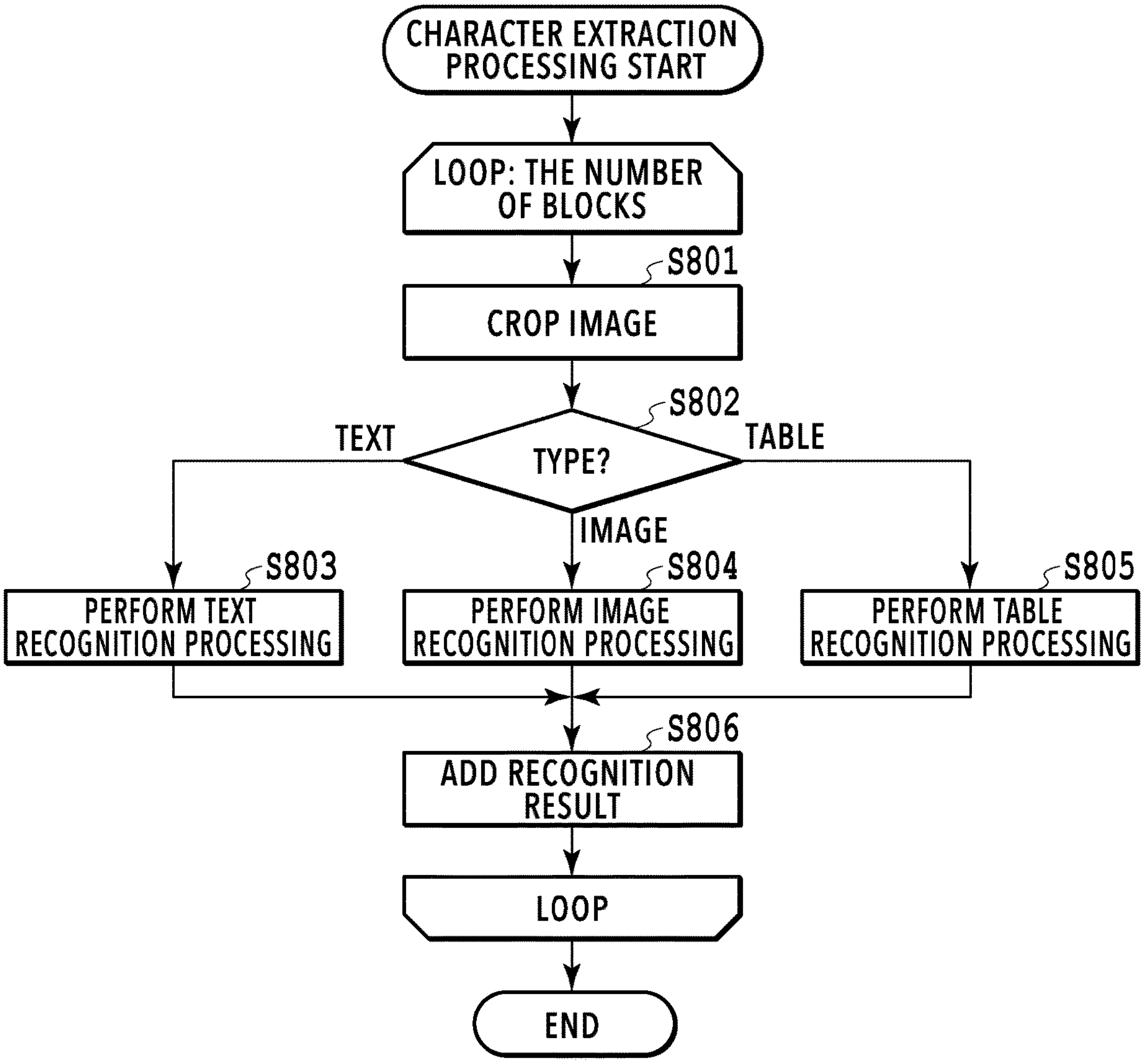
FIG. 8 is a flowchart illustrating character extraction processing.

FIG. 8 is a detailed flowchart of the character extraction processing described above in the section of S503.

The processing at S801 to S806 is repeated the same number of times as the number of blocks based on all block information generated through the block extraction processing executed at S502.

At S801, an image of each block is cropped from the document image data. After the image of each block is cropped, the processing proceeds to S802.

At S802, the type of the image of each cropped block is determined. After the type of the image of each cropped block is determined, the processing proceeds to S803 to S805.

At S802, in a case where the type is determined as text, the processing proceeds to S803. At S803, the text recognition is performed for the image of each cropped block, and then the processing proceeds to S806.

At S802, in a case where the type is determined as image, the processing proceeds to S804. At S804, the image recognition is performed for the image of each cropped block, and then the processing proceeds to S806.

At S802, in a case where the type is determined as table, the processing proceeds to S805. At S805, the table recognition is performed for the image of each cropped block, and then the processing proceeds to S806.

At S806, the character string as the recognition result is added to each cropped block.

At S806, the processing returns to S801 in a case where such a character string is yet to be added to every block. The processing of the flowchart illustrated in FIG. 8 ends in a case where the character string is added to every block.

Figure 9:
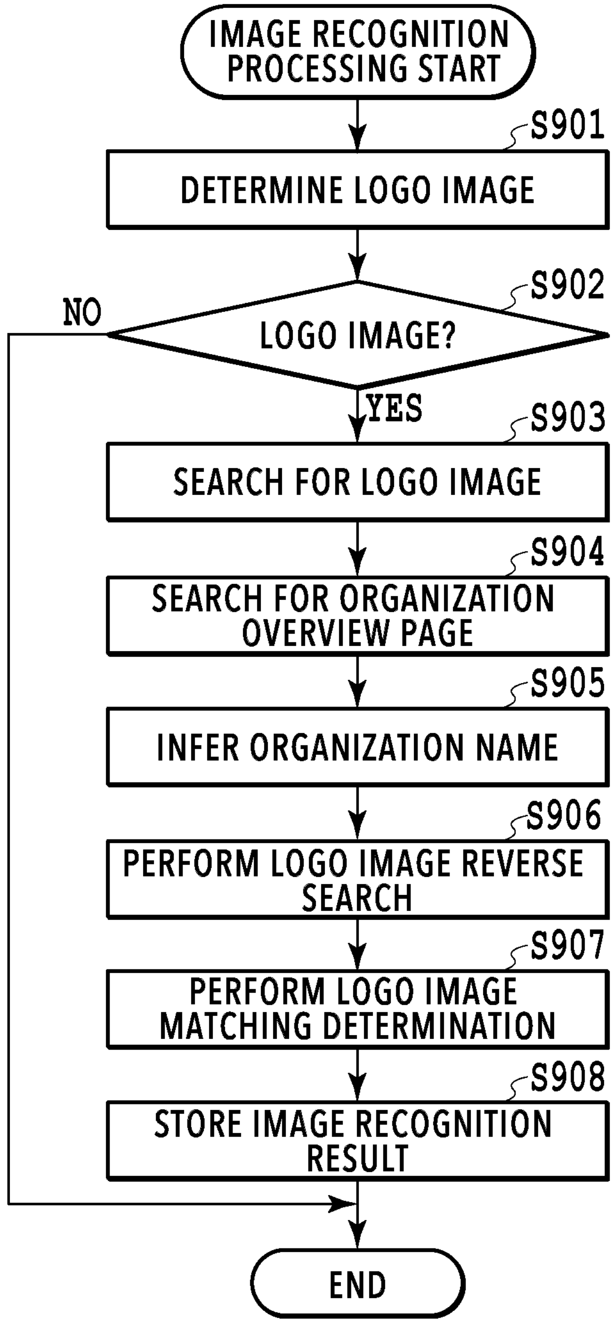
FIG. 9 is a flowchart illustrating image recognition processing.

FIG. 9 is a detailed flowchart of the recognition processing of the image recognition at S804 in a case where the type is determined as image. The flowchart in FIG. 9 is processed by the organization name inference unit 233.

At S901, determination processing that determines whether the image (the input image) obtained at S804 is the logo image is executed, and then the processing proceeds to S902. The logo image determination is performed with a condition such as a position, a size, or the number of colors. For example, the input image is determined as the logo image in a case where the input image satisfies the conditions that the input image is located at an upper part of a form, has a size in a predetermined size range, and has colors in a predetermined number or less. The logo image determination may be performed by any other method that, for example, infers whether the input image is a logo image by machine learning.

At S902, in a case where the input image is determined as a logo image, the processing proceeds to S903. In a case where the input image is not determined as a logo image, the processing of the flowchart illustrated in FIG. 9 ends.

At S903, the input image is searched by using an image search service. The image search service is, for example, a service through a network such as the Internet. In a case where the input image and an image (similar logo image) similar to the input image are not found, the result of the logo image search is set as empty. In a case where a plurality of images (similar logo images) similar to the input image are found, an image having highest similarity is adopted as the result of the logo image search. After the logo image search is completed, the processing proceeds to S904.

At S904, a page of an organization overview is searched based on the result of the logo image search processing at S903 through the network such as the Internet by tracing links in a site of a page including a matching image. In a case where the result of the logo image search processing at S903 is empty or no organization overview page is found, the result of the organization overview page search is set as empty.

The organization overview page search searches for, for example, a page having a predetermined page title, a page having a predetermined page name, a page including a predetermined character string in contents, or a page having a predetermined page configuration. Specifically, such a page corresponds to a page in a page title, a page name, or a content of which a character string such as "company overview", "organization overview", "location", or "establishment", which frequently appears in an organization overview page, is included, or a page directly below "/About/" in a page level structure. These conditions are provided with priorities, and a page with the highest priority is determined as the organization overview page. The organization overview page may be searched by any other method that, for example, infers whether the page of interest is the organization overview page by machine learning. After the organization overview page search processing is completed, the processing proceeds to S905.

At S905, an organization name is inferred based on the result of the web page search by the organization overview page search processing at S904, text of the organization overview page, or the like. In a case where the result of the organization overview page search processing is empty or no organization name can be inferred, the result of the organization name inference is set as empty. In the organization name inference, similarly to the processing at S504 to S506, the input word string in which the text is divided into words is inferred with the organization name inference model 222, and a word to which an organization name label is applied is extracted as an organization name. In a case where a plurality of words are extracted as an organization name, a word having a highest reliability score is adopted as an organization name. After the organization name inference processing is completed, the processing proceeds to S906.

At S906, logo image reverse search processing that searches the logo of the inferred organization name by using, for example, a search service executed through a network such as the Internet is executed. For example, ""ABC Inc." (blank) logo" is searched by using the search service. In a case where the result of the organization name inference processing at S905 is empty or no organization logo is found, the result of the logo image reverse search processing is set as empty. After the logo image reverse search processing is executed, the processing proceeds to S907.

At S907, it is determined whether an image obtained from the logo image reverse search processing matches the input image. In a case where the result of the logo image reverse search processing at S906 is empty or the image obtained from the logo image reverse search processing does not match the input image, it is determined that no image matches the input image. After the logo image match determination processing is completed, the processing proceeds to S908.

At S908, in a case where the image matches the input image in the logo image match determination processing, the word extracted from the organization name inference processing at S905 is determined as an image recognition result of the input image and is stored. After the image recognition result is stored, the processing process of the flowchart illustrated in FIG. 9 ends.

With the execution of the processing described in the first embodiment, it is possible to estimate (infer) an organization name from a logo image without establishing a logo information table, which needs a large amount of labor for maintenance and the like.

Second Embodiment

A second embodiment according to the present disclosure will be described below with reference to the accompanying drawings. The following description of the second embodiment is mainly made on difference from the first embodiment.

In the first embodiment, an image having highest similarity is adopted in a case where the plurality of the images are found through the logo image search processing at S903. Consider a case where the plurality of the organizations such as group companies constitute a group and use the same logo. In such a case, the plurality of the images having high similarities that are substantially the same are found, and thus an accurate organization name potentially cannot be extracted. In the second embodiment, organization information as well as an organization name are inferred and extracted for the plurality of the images having high similarities, and the organization name in which the organization information most matches as compared to other named entities in the document image data is set as a result of logo image recognition.

Figure 10:
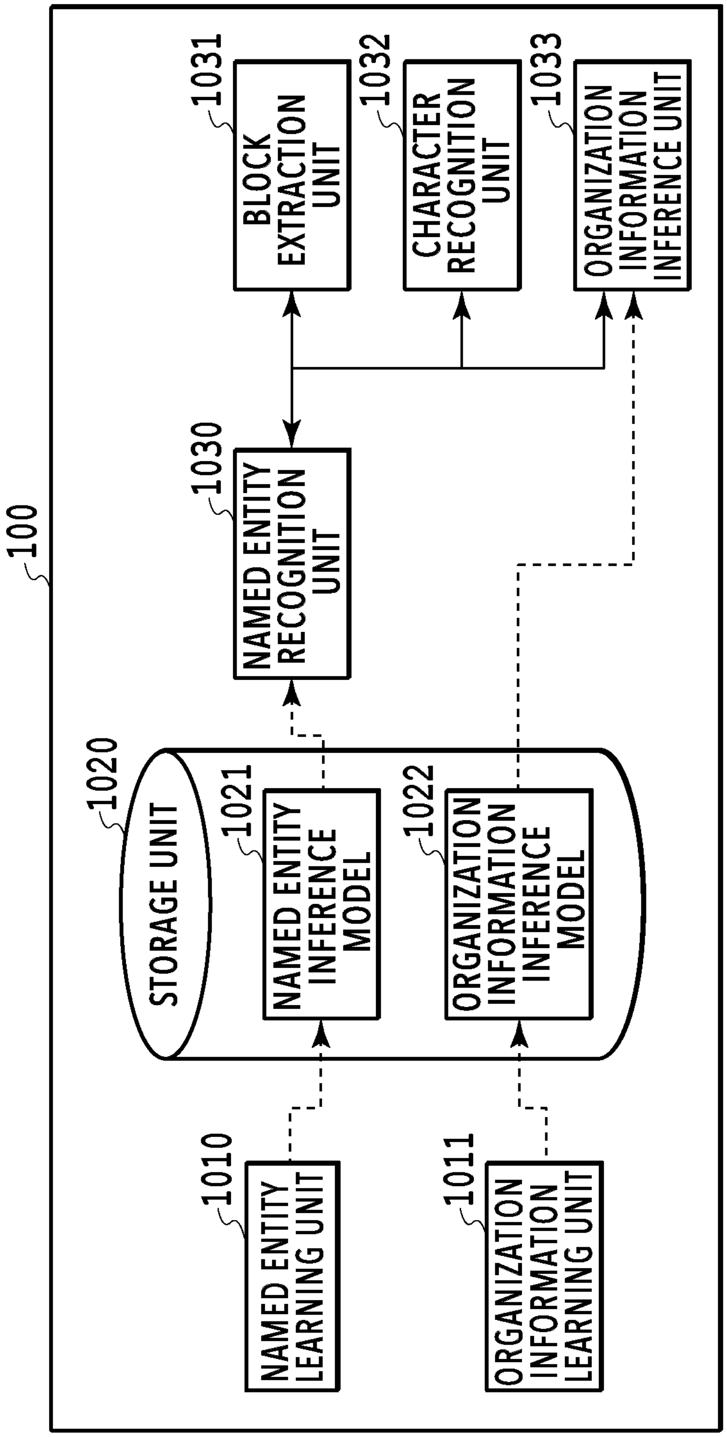
FIG. 10 is a functional block diagram illustrating a functional configuration of an information processing apparatus.

FIG. 10 is a block diagram illustrating a functional configuration of the information processing apparatus 100 in the present embodiment.

To infer organization information as well as an organization name, an organization information learning unit 1011, an organization information inference model 1022, and an organization information inference unit 1033 are provided in the information processing apparatus 100 in place of the organization name learning unit 211, the organization name inference model 222, and the organization name inference unit 233 in FIG. 2. The named entity learning unit 1010 and the named entity inference model 1021 respectively correspond to the named entity learning unit 210 and the named entity interference model 221, the description thereof already being provided above.

Figure 11:
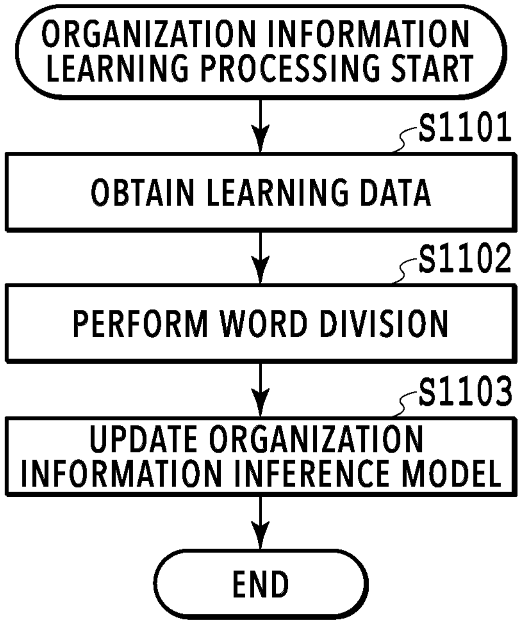
FIG. 11 is a flowchart illustrating organization name inference model establishment processing by the organization name learning unit.

FIG. 11 is a flowchart illustrating processing that the organization information learning unit 1011 establishes the organization information inference model 1022.

In this organization information learning processing, the same processing as the organization name learning processing described above in the first embodiment is basically executed, but learning data used in the organization information learning processing is different from learning data used in the organization name learning processing. As for the learning data in the organization information learning processing, a label is applied not only to an organization name but also to a character string such as a location (address), a phone number, or a mail address on a page introducing an organization, such as an organization overview at a web page of an organization. A label "ORG" is applied to the organization name, a label "ADR" is applied to the location (address), a label "TEL" is applied to the phone number, and a label for the mail address (MAIL) is applied.

At S1101, a learning character string of organization information to which an organization information label is applied is obtained, and then the processing proceeds to S1102.

At S1102, a learning word string of the organization information is generated by dividing the learning character string of the organization information into words. This processing is performed for all learning character strings of the organization information. After the CPU 102 generates all learning word strings of the organization information, the processing proceeds to S1103.

At S1103, the organization information inference model 1022 is established based on all learning word strings of organization information, and the data of the organization information inference model 1022 is stored in a storage unit 1020. After the organization information inference model 1022 is updated, the processing process of the flowchart illustrated in FIG. 11 ends.

Figure 12:
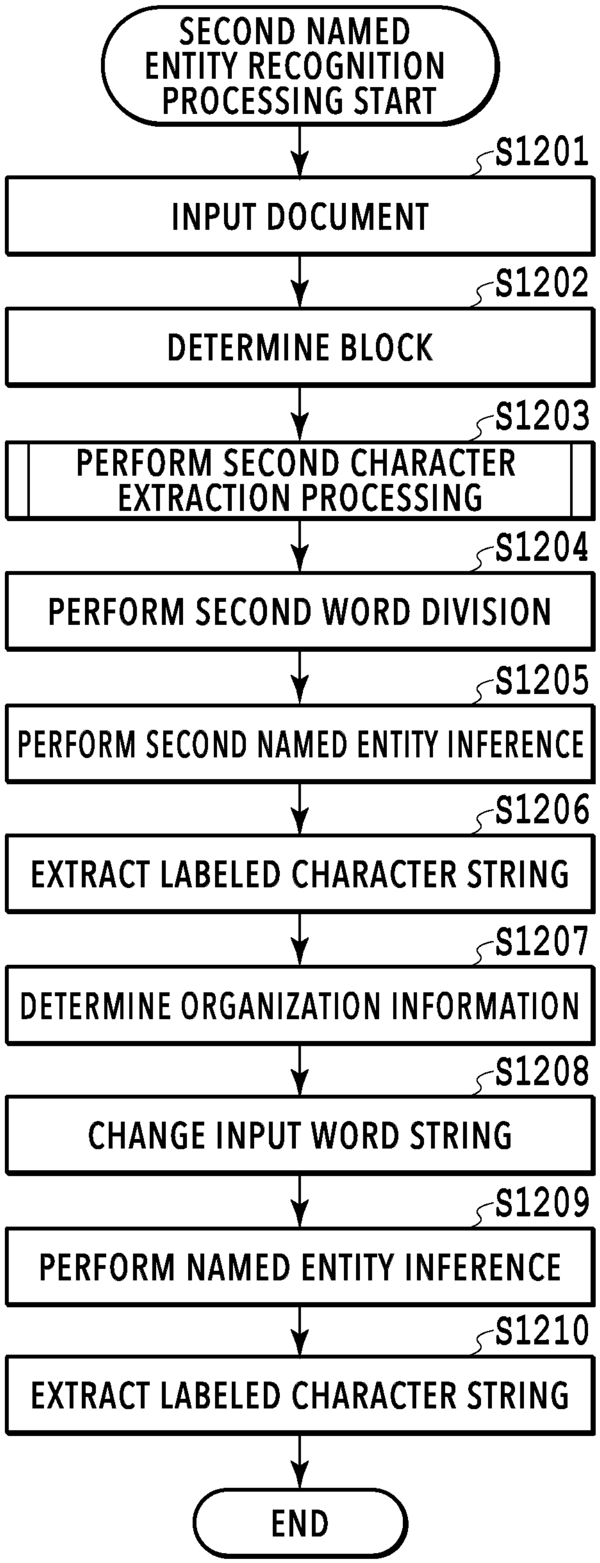
FIG. 12 is a flowchart illustrating named entity recognition processing by the named entity recognition unit.

FIG. 12 is a flowchart illustrating processing that a named entity recognition unit 1030 extracts the named entities from the document image data.

At S1201, the document image data is obtained by optically reading a paper document by using a scanner or the like. After the document image data is obtained, the processing proceeds to S1202.

At S1202, a block extraction unit 1031 extracts a region (block) of each content type from the obtained document image data. Block information is generated by using results of the extraction and stored in the RAM 104. After the block information is stored in the RAM 104, the processing proceeds to S1203.

At S1203, the character recognition unit 1032 performs second character extraction processing based on the document image data and the block information. The second character extraction processing will be described later in detail. After the character recognition unit 1032 executes the second character extraction processing and all input word strings of the organization information are generated, the processing proceeds to S1204.

FIG. 13 illustrates exemplary input word strings of the organization information extracted through the second character extraction processing based on the document image data in FIG. 6 and the block information in FIG. 7. A plurality of pieces of the organization information are extracted as a first input word string of organization information from the block 601 corresponding to a logo image in FIG. 6. The organization information is a plurality of sets of labeled character strings each including a set of a label and a character string. The first input word string of the organization information in FIG. 13 includes two pieces of the organization information in the order of similarity of images found by image search. The first organization information is an organization name "ORG, AAA Inc.", a location "Denen, Chuo City, Tokyo", and a phone number "03-1234-5678". The second organization information is an organization name "ORG, BBB Ltd." and a phone number "075-5678-1234".

At S1204, no processing is performed for an input word string of the organization information for a logo image but the same word division processing as the processing at S504 is performed for any other input word string of the organization information, and then the processing proceeds to S1205.

At S1205, a named entity label of organization information is inferred for each word in the input word string of the organization information in which the word division processing is performed at S1204. The second named entity inference processing at S1205 is the same as the processing at S505. After the second named entity inference processing is performed at S1205, the processing proceeds to S1206.

At S1206, the named entity in the input word string of organization information is extracted based on the named entity label of organization information inferred for each word at S1205. As a result, the named entity for the input word string of organization information except for the logo image is extracted, and the processing proceeds to S1207.

At S1207, the organization information that most matches the document image data is determined by comparing the plurality of pieces of the organization information extracted from the logo image with the named entity extracted from organization information other than the logo image.

For example, in a case where the second named entity character string including "1-23-4 Denen, Chuo City, Tokyo" is extracted as an "ADR" label from organization information other than the logo image, the second named entity character string matches a character string "ADR" in the second input word string in the first organization information inferred based on the logo image and illustrated in FIG. 13. Accordingly, the organization information matching the document image data is determined as "organization name "AAA Inc.", location "Denen, Chuo City, Tokyo", phone number "03-1234-5678"".

In another example where the second named entity character string including "075-5678-0011" as a "TEL" label is extracted from the organization information other than the logo image, the second named entity character string is compared with the "TEL" character string in the second input word string inferred based on a logo image and illustrated in FIG. 13. The first seven digits of "TEL" matches the "TEL" character string in the second input word string in the second organization information. Accordingly, the organization information matching the document image data is determined as "organization name "ORG, BBB Ltd.", phone number "075-5678-1234"".

In a case where the named entity from the organization information other than the logo image includes no information matching organization information inferred based on the logo image, the first organization information having highest image similarity is adopted.

After one piece of organization information is selected at S1207, the processing proceeds to S1208.

At S1208, an input word string of the organization information for the logo image is changed to an organization name of the selected organization information, and then the processing proceeds to S1209.

At S1209, the named entity inference processing including the logo image is performed. This processing is the same as the processing at S505. After the named entity inference processing including the logo image is completed, the processing proceeds to S1210.

At S1210, the labeled character string extraction processing including the logo image is performed. This processing is the same as the processing at S506. After the labeled character string extraction processing including the logo image is completed, the processing process of the flowchart illustrated in FIG. 12 ends.

Figure 14:
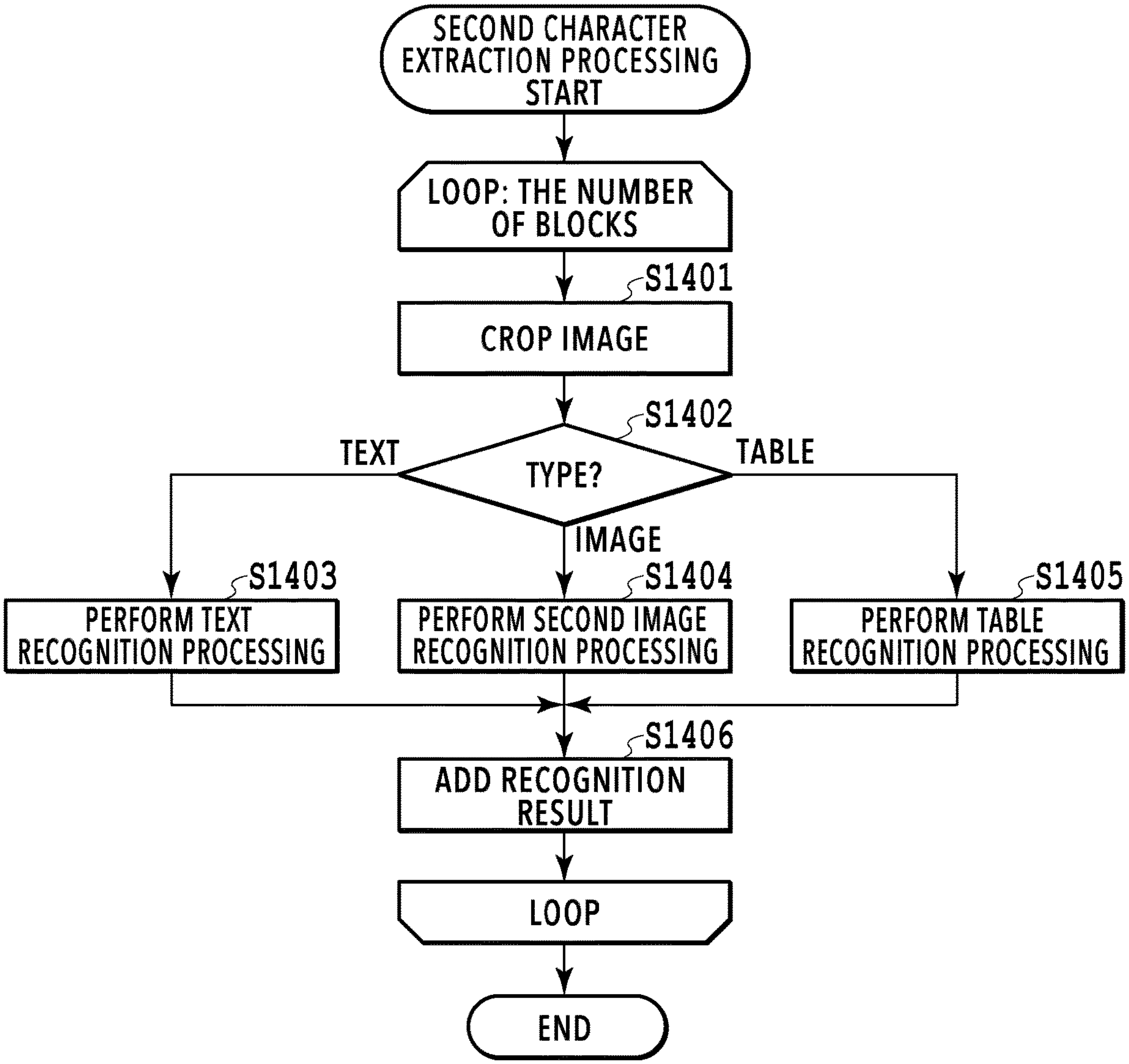
FIG. 14 is a flowchart illustrating second character extraction processing.

FIG. 14 is a flowchart illustrating the second character extraction processing executed at S1203.

Processing other than S1404 is the same as processing illustrated in the flowchart in FIG. 8.

At S1404, the second image recognition processing is performed for the image of each cropped block, which will be described later in detail.

Figure 15:
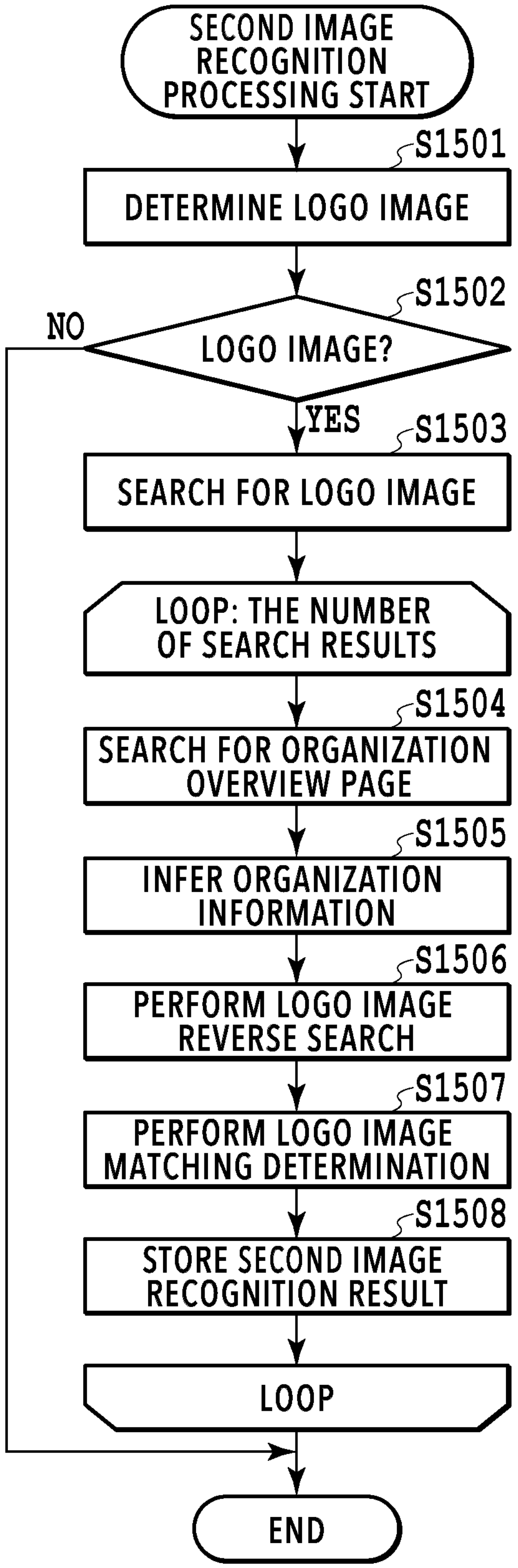
FIG. 15 is a flowchart illustrating second image recognition processing.

FIG. 15 is a flowchart illustrating the second image recognition processing executed at S1404. The flowchart in FIG. 9 is processed by the organization information inference unit 1033.

At S1501, the determination processing that determines whether the image (the input image) obtained at S1404 is the logo image is executed, and then the processing proceeds to S1502.

At S1502, in a case where the input image is determined as the logo image, the processing proceeds to S1503. In a case where the input image is not determined as the logo image, the processing process of the flowchart illustrated in FIG. 15 ends.

At S1503, the input image is searched by using an image search service, and then the processing proceeds to S1504.

Loop processing at S1504 to S1508 is executed the same number of times as the number of search results found through the logo image search processing at S1503. In other words, the loop processing is performed for each of the plurality of the images found through the logo image search processing at S1503.

At S1504, organization overview page search is performed for the image found through the logo image search processing at S1503, and then the processing proceeds to S1505.

At S1505, the organization information including an organization name is inferred based on the text of an organization overview page obtained from the processing at S1504. In the organization information inference, similarly to the processing at S504 to 506, the input word string in which the text is divided into words is inferred with the organization information inference model 1022 to extract a word with an "ORG" label, an "ADR" label, a "TEL" label, or the like as organization information. In a case where the plurality of the words are extracted, the word having a highest reliability score is adopted. After the organization information inference is completed, the processing proceeds to S1506.

At S1506, the logo image reverse search processing is performed, and then the processing proceeds to S1507.

At S1507, the logo image match determination processing is performed, and then the processing proceeds to S1508.

At S1508, in a case where the image matches the input image in the logo image match determination processing, the word extracted through the organization information inference processing at S1505 is stored as one recognition result of the input image.

After the loop processing at S1504 to S1508 is executed the same number of times as the number of search results found through the logo image search processing, the processing process of the flowchart illustrated in FIG. 15 ends.

In the second embodiment, the organization information as well as an organization name are inferred and extracted for the plurality of the images having high similarities, and the organization name in which the organization information most matches as compared to other named entities in the document image data is set as a result of logo image recognition.

With the execution of the processing described in the second embodiment, an accurate organization name can be extracted without establishing a logo information table, which needs a large amount of labor for maintenance and the like, even in a case where the plurality of the organizations using the same logo constitute a group.

Third Embodiment

A third embodiment according to the present disclosure will be described below with reference to the accompanying drawings. The following description of the third embodiment is mainly made on difference from the first embodiment.

In the first embodiment, the image is searched, the organization overview page is obtained, and the organization name is inferred based on the logo image. In the third embodiment, the organization name inferred based on the logo image through several processes is stored as a history in association with the logo image, and the result stored as the history is used in subsequent inference of the organization name based on the input image.

In a functional configuration of the information processing apparatus 100 according to the third embodiment, a history DB 224 (not illustrated) is added to the storage unit 220 in the functional configuration of the information processing apparatus 100 according to the first embodiment illustrated in FIG. 2. The organization name inference unit 233 additionally includes a functional block of a determination unit (not illustrated) configured to determine whether a history for the input image exists in the history DB 224 stored in the storage unit 220.

Figure 16:
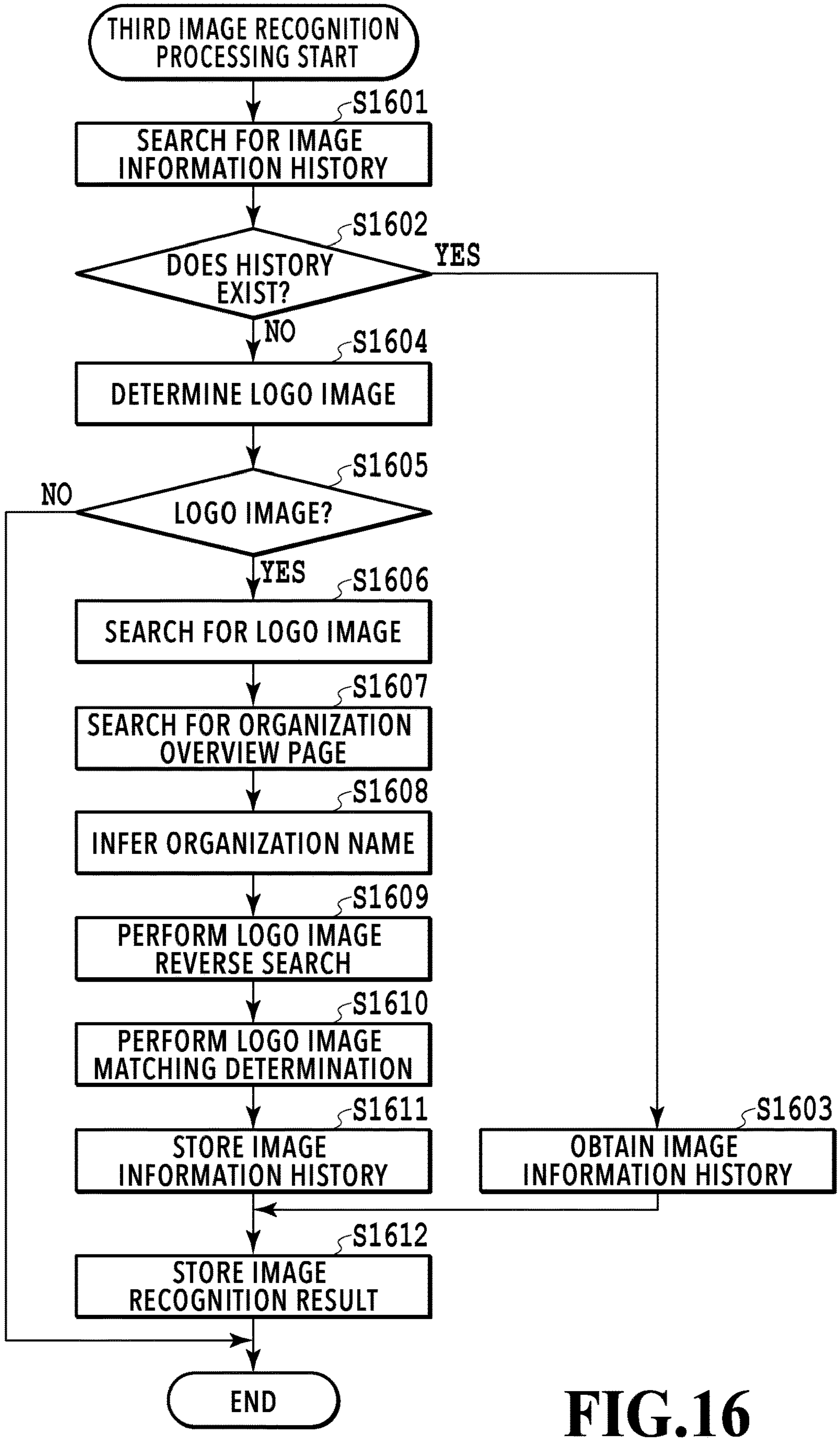
FIG. 16 is a flowchart illustrating third image recognition processing.

FIG. 16 is a flowchart illustrating the third image recognition processing that recognizes an image block and infers the organization name in the present embodiment. The flowchart in FIG. 16 is processed by the organization name inference unit 233.

At S1601, it is determined whether the history for the input image exists in the history DB 224 stored in the storage unit 220, and then the processing proceeds to S1602.

At S1602, in a case where the determination unit determines that the history for the input image exists in the history DB 224, the processing proceeds to S1603. In a case where the determination unit determines that no history for the input image exists in the history DB 224, the processing proceeds to S1604.

At S1603, the organization name of the found history for the input image is obtained, and then the processing proceeds to S1612.

Processing at S1604 to S1610 is the same as the processing at S901 to S907 in the first embodiment, and after the processing at S1610 is executed, the processing proceeds to S1611.

At S1611, the word extracted through the organization name inference processing at S1608 is stored as the organization name for the input image in the history DB 224, and then the processing proceeds to S1612.

At S1612, the organization name of the history for the input image or the word extracted through the organization name inference processing at S1608 is determined as an image recognition result of the input image and stored. After the image recognition result is stored, the processing process of the flowchart illustrated in FIG. 16 ends.

In the third embodiment, the result stored as the history is used in subsequent inference of the organization name from the input image. With the execution of the processing described in the third embodiment, it is possible to estimate the organization name from the logo image without establishing the logo information table, which needs a large amount of labor for maintenance and the like, and it is also possible to reduce the amount of communication and perform high speed processing.

Fourth Embodiment

A fourth embodiment according to the present disclosure will be described below with reference to the accompanying drawings. The following description of the fourth embodiment is mainly made on difference from the first embodiment.

Recently, the use of a form illustrating a two-dimensional code in which the URL of a web page of an organization is encoded as organization introduction has been increasing.

In the first embodiment, the web page on which an organization overview is written is searched by performing the image search based on the logo image. In the fourth embodiment, the URL of the web page related to an organization, which is designated by the two-dimensional code of the document image data, is obtained. Accordingly, it is possible to reliably access the web page of the organization without performing the image search. The web page can be reliably found and extracted at high speed, and the accuracy of organization name inference can be improved.

However, in a case where only an organization name is obtained from the web page designated by the obtained two-dimensional code, what is indicated by the organization name is sometimes unclear. Thus, the named entity inference processing needs to be performed for the web page of the corresponding organization to infer what is indicated by the organization name.

In a functional configuration of the information processing apparatus 100 according to the fourth embodiment, the organization name inference unit 233 additionally includes two functional blocks below. Specifically, the organization name inference unit 233 additionally includes a two-dimensional code obtaining unit (not illustrated) configured to obtain the two-dimensional code in the input image and a two-dimensional code decoding unit (not illustrated) configured to perform decode processing of the two-dimensional code.

Figure 17:
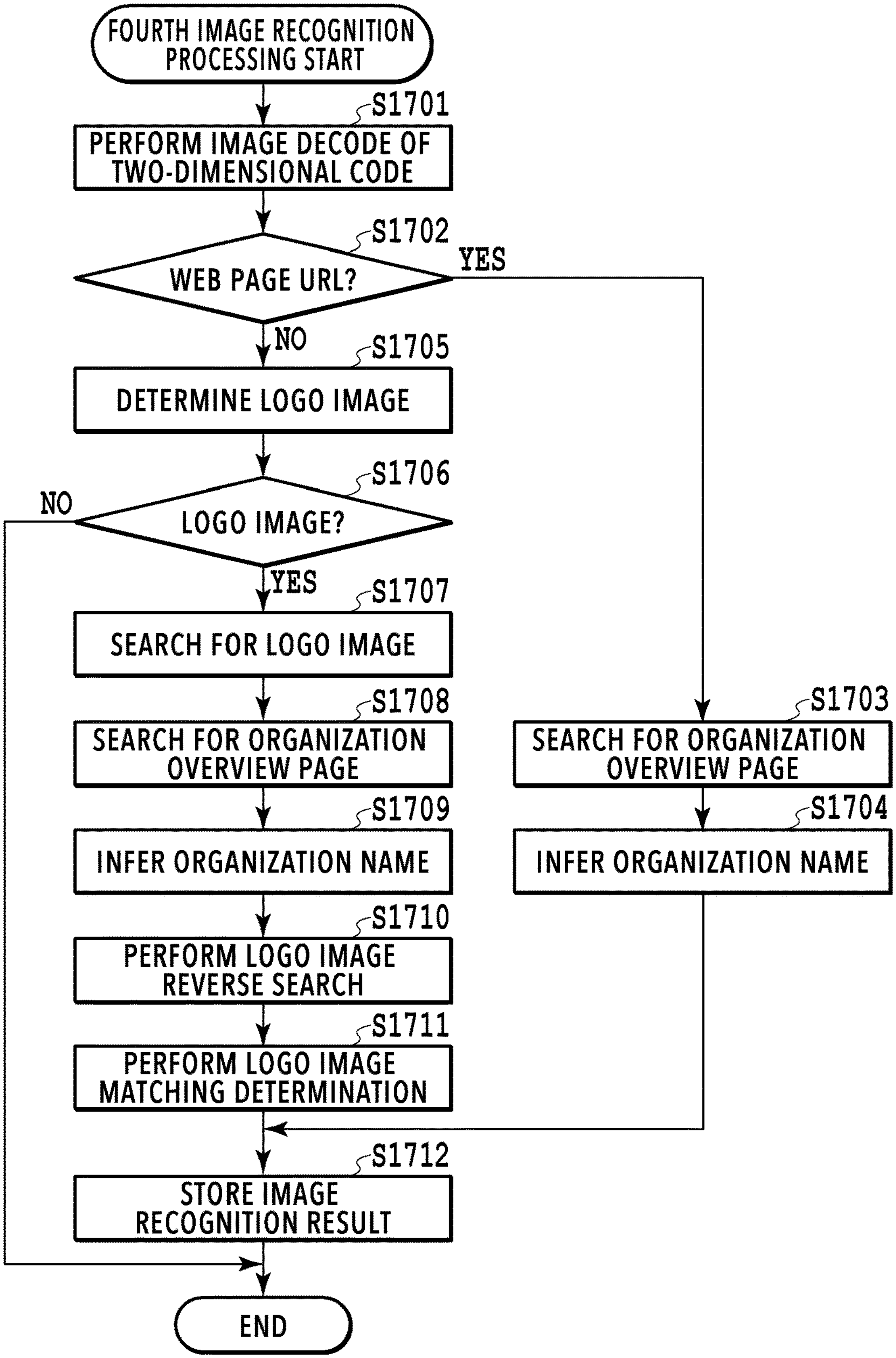
FIG. 17 is a flowchart illustrating fourth image recognition processing.

FIG. 17 is a flowchart illustrating the fourth image recognition processing that recognizes an image block and infers the organization name in the present embodiment. The flowchart in FIG. 17 is processed by the organization name inference unit 233.

At S1701, the two-dimensional code decoding unit performs the image decode processing for the two-dimensional code obtained from the input image by the two-dimensional code obtaining unit and obtains a character string. After the character string is obtained, the processing proceeds to S1702.

At S1702, in a case where the obtained character string is a web page URL, the processing proceeds to S1703. In a case where the obtained character string is not a web page URL, the processing proceeds to S1705.

At S1703, the organization overview page search processing described above in the section of S904 is performed, and then the processing proceeds to S1704.

At S1704, the organization name inference processing described above in the section of S905 is performed to extract the word having the organization name label as the organization name, and then the processing proceeds to S1712.

Processing at S1705 to S1711 is the same as the processing at S901 to S907 in the first embodiment, and after the processing at S1711 is executed, the processing proceeds to S1712.

At S1712, the word extracted through the organization name inference processing at S1704 is determined and stored as the recognition result of the two-dimensional code, or the word extracted through the organization name inference processing at S1709 is determined and stored as the image recognition result of the input image. After the image recognition result is stored, the processing process of the flowchart illustrated in FIG. 17 ends.

In the fourth embodiment, the web page of the organization is obtained based on the two-dimensional code of document image data and is reliably accessed without performing the image search. With the execution of the processing described in the fourth embodiment, it is possible to estimate an organization name without establishing the logo information table, which needs a large amount of labor for maintenance and the like. Further, since the web page of the organization is obtained based on the two-dimensional code, it is possible to reliably find the web page at high speed and improve the accuracy of organization name inference.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-198712, filed Dec. 13, 2022, which is hereby incorporated by reference wherein in its entirety.

What is claimed is:

1. An information processing apparatus connectable to the Internet, the information processing apparatus comprising:

at least one processor or circuitry configured to:

generate a named entity inference model from a first learning character string in which a named entity label is applied to each character string and dividing the first learning character string into words;

generate an organization information inference model from a second learning character string in which a label is applied to an organization name and dividing the second learning character string into words;

obtain a first logo image corresponding to a logo representing a particular organization, and information about the first logo image from a scanned image of a document;

perform a first search to search for a web page including an image similar to the first logo image through the Internet;

infer an organization name corresponding to the image included in the searched web page by performing named entity recognition using the organization information inference model that receives the image and the information about the image obtained from the first search as an input, and that outputs an organization name associated with the image and a label of the information about the image obtained from the first search;

perform a second search to search for a second logo image associated with the inferred organization name through the Internet;

determine whether the second logo image found from the second search matches the first logo image obtained from the scanned image;

store the inferred organization name as a recognition result of the first logo image obtained from the scanned image in a case where the second logo image found from the second search is determined to match the first logo image obtained from the scanned image;

setting the recognition result of the first logo image obtained from the scanned image as empty in a case where the second logo image found from the second search is determined to not match the first logo image obtained from the scanned image;

infer a named entity label of the information about the first logo image by performing named entity recognition using the named entity inference model that receives only the information about the first logo image as an input, and that outputs the named entity label of the information about the first logo image;

compare first content in the label of the information about the first logo image with second content in the label of the information about the image obtained from the first search; and determine the inferred organization name of the image in which the first content matches the second content, as an organization name of the first logo image.

2. The information processing apparatus according to claim 1, wherein the at least one processor or circuitry obtains the first logo image from the scanned image by cropping a logo image from the scanned image based on a condition including at least one of a position, a size, or the number of colors in the scanned image.

3. The information processing apparatus according to claim 1, wherein the at least one processor or circuitry searches for the web page including a predetermined character string in the search using the first logo image obtained from the scanned image.

4. The information processing apparatus according to claim 1, wherein a named entity for the image similar to the first logo image obtained from the scanned image includes information of an organization name, a location, a phone number, or a mail address.

5. The information processing apparatus according to claim 1, wherein the at least one processor or circuitry is further configured to:

store logo images and a respective inferred organization name of each logo image in association with each other in a storage; and determine whether the first logo image obtained from the scanned image matches any of the stored logo images before the search for the web page through the Internet.

6. The information processing apparatus according to claim 5, wherein:

in a state where the obtained logo image from the scanned image is determined to match any of the stored logo images, the at least one processor or circuitry infers an organization name of the stored logo image matching the first logo image obtained from the scanned image, as the organization name of the first logo image obtained from the scanned image, and in a state where the first logo image obtained from the scanned image is determined to match none of the stored logo images, the at least one processor or circuitry stores the first logo image obtained from the scanned image and the inferred organization name in association with each other in the storage.

7. A method of controlling an information processing apparatus connectable to the Internet, the method comprising:

generating a named entity inference model from a first learning character string in which a named entity label is applied to each character string and dividing the first learning character string into words;

generating an organization information inference model from a second learning character string in which a label is applied to an organization name and dividing the second learning character string into words;

obtaining a first logo image corresponding to a logo representing a particular organization, and information about the first logo image from a scanned image of a document;

performing a first search to search for a web page including an image similar to the first logo image through the Internet;

inferring an organization name corresponding to the image included in the searched web page by performing named entity recognition using the organization information inference model that receives the image and the information about the image obtained from the first search as an input, and that outputs an organization name associated with the image and a label of the information about the image obtained from the first search;

performing a second search to search for a second logo image associated with the inferred organization name through the Internet;

determining whether the second logo image found from the second search matches the first logo image obtained from the scanned image;

storing the inferred organization name as a recognition result of the first logo image obtained from the scanned image in a case where the second logo image found from the second search is determined to match the first logo image obtained from the scanned image;

setting the recognition result of the first logo image obtained from the scanned image as empty in a case where the second logo image found from the second search is determined to not match the first logo image obtained from the scanned image;

inferring a named entity label of the information about the first logo image by performing named entity recognition using the named entity inference model that receives only the information about the first logo image as an input, and that outputs the named entity label of the information about the first logo image;

comparing first content in the label of the information about the first logo image with second content in the label of the information about the image obtained from the first search; and determining the inferred organization name of the image in which the first content matches the second content, as an organization name of the first logo image.

8. A non-transitory computer readable storage medium storing a program executable by a computer to perform a method of controlling an information processing apparatus connectable to the Internet, the method comprising:

generating a named entity inference model from a first learning character string in which a named entity label is applied to each character string and dividing the first learning character string into words;

generating an organization information inference model from a second learning character string in which a label is applied to an organization name and dividing the second learning character string into words;

obtaining a first logo image corresponding to a logo representing a particular organization, and information about the first logo image from a scanned image of a document;

performing a first search to search for a web page including an image similar to the first logo image through the Internet;

inferring an organization name corresponding to the image included in the searched web page by performing named entity recognition using the organization information inference model that receives the logo image and information about the image obtained from the first search as an input, and that outputs an organization name associated with the input image and a label of the information about the image obtained from the first search;

performing a second search to search for a second logo image associated with the inferred organization name through the Internet;

determining whether the second logo image found from the second search matches the first logo image obtained from the scanned image;

storing the inferred organization name as a recognition result of the first logo image obtained from the scanned image in a case where the second logo image found from the second search is determined to match the first logo image obtained from the scanned image;

setting the recognition result of the first logo image obtained from the scanned image as empty in a case where the second logo image found from the second search is determined to not match the first logo image obtained from the scanned image;

inferring a named entity label of the information about the first logo image by performing named entity recognition using the named entity inference model that receives only the information about the first logo image as an input, and that outputs the named entity label of the information about the first logo image;

comparing first content in the label of the information about the first logo image with second content in the label of the information about the image obtained from the first search; and determining the inferred organization name of the image in which the first content matches the second content, as an organization name of the first logo image.

* * * * *